Nov. 14, 1950  R. S. HOPKINS  2,529,943

PHOTOGRAPHIC RECORDING EQUIPMENT

Filed Jan. 22, 1946

Roy S. Hopkins
INVENTOR

BY
ATTORNEYS

Patented Nov. 14, 1950

2,529,943

UNITED STATES PATENT OFFICE 2,529,943

PHOTOGRAPHIC RECORDING EQUIPMENT

Roy S. Hopkins, Rochester, N. Y., assignor to Eastman Kodak Company, Rochester, N. Y., a corporation of New Jersey Application January 22, 1946, Serial No. 642,600

2 Claims. (Cl. 88—24)

The present invention relates to photographic recording equipment and more particularly to an improvement in photographic recording equipment in which both sides of a continuously moving document are photographed simultaneously.

As is well known, in continuous photographic copying machines, the document is moved through a feedway and past an exposure aperture which is in the field of a camera. The document is illuminated on both sides as it passes the exposure aperture and the reflected image of each side of the document is directed by mirrors to the camera lens, so that the images appear on the film in the camera in side-by-side relationship and in abutment or slightly spaced apart. It has been found that with certain types of documents, particularly those which contain printed or written matter on both sides of relatively thin or translucent paper, that "ghost" or "X-ray" images are obtained which are caused by the light which is transmitted through the document. For instance, in photographing a check, the image of the face of the check will show the endorsement on the back of the chek and the image of the back of the check will show the printed and written matter appearing on the face of the check. It is understood, of course, that the "ghost" or transmitted image in each case will not be as plain or distinct as the reflected image. In the case of a check, the "ghost" or transmitted image may have some value in that the images each corroborate the other as being of opposite sides of the same document. However, with other types of documents which contain considerable printed or written matter on each side, the transmitted image renders the reflected image unreadable.

The primary object of the invention is the provision of a filtering means for eliminating the image formed by the light transmitted through the document.

Another object of invention is to provide a filtering means which can be readily inserted or removed by the operator when relatively opaque documents are being photographed.

These and other objects will appear from the following specification, the novel features being pointed out in the claims at the end thereof.

The aforementioned and other objects of the invention are embodied in a photographic copying machine which includes a feedway comprising two spaced-apart walls in which there are apertures which are in registry and in the field of a camera, a feeding means for continuously moving the document between the walls of the feedway and past the exposure apertures, means for illuminating both sides of the document as it passes the exposure apertures, means for reflecting the image of both sides of the document to the camera lens as well as the transmitted images of both sides, an advancing means for the film and which is connected to the feeding means for the document so that the two operate in synchronism, and colored filters which are adjacent the exposure apertures and between the mirrors and camera lens for eliminating the transmitted image from each reflected beam.

Coming now to the drawings wherein like reference characters denote like parts:

Figure 1:
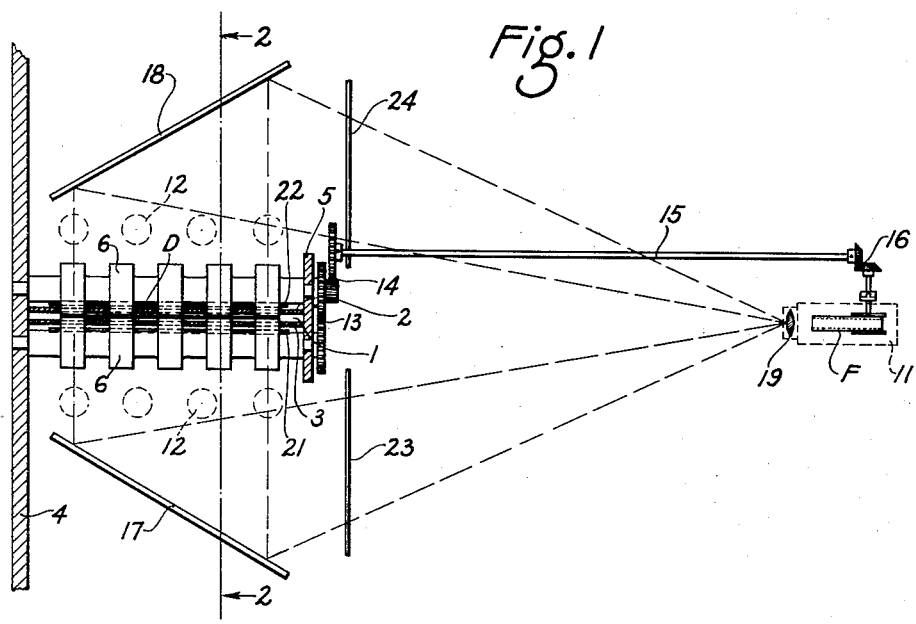
Fig. 1 is a diagrammatic plan view of a photographic copying machine embodying my invention.

In the preferred embodiment of my invention, the feedway 1 is formed by the walls 2 and 3 which are mounted between the outer casing wall 4, only one of which is shown, and an intermediate wall 5. The feed rolls 6 and 7 for advancing the document D through the feedway are also mounted between the walls 4 and 5 and may be driven in any conventional manner, such as by a motor which may be connected to the rolls by means of a belt. The walls 2 and 3 are provided with apertures 8 to allow the feed rolls to extend therethrough for contacting and moving the document D, and with two transverse apertures 9 and 10 which are in registry and in the field of the camera 11. The apertures 9 and 10 provide the station at which the document is photographed as it is moved past the apertures by the rolls 6 and 7.

The lamps 12 provide for illumination of the document as it passes the apertures 9 and 10 and may be arranged in banks on either side of the feed rolls 6 and 7 as indicated by the dotted lines in Fig. 1.

Each set of feed rolls 6 and 7 is geared to run together, as indicated at 13, and the rolls 6 are provided with a take-off gear train 14 which is connected to the camera film drive by means of the shaft 15 and the bevel gears 16. The drives are so geared that the film F in the camera 11 is advanced continuously with the document and in proper synchronism.

Figure 2:
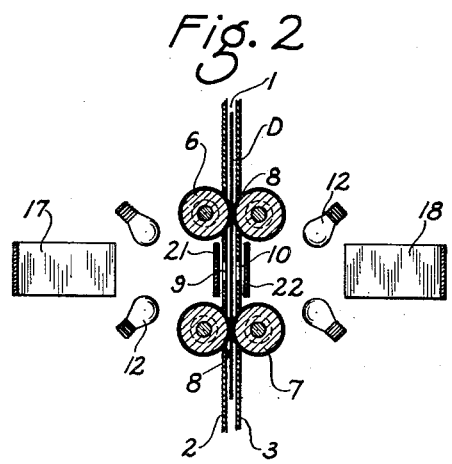
Fig. 2 is a diagrammatic sectional view taken on line 2—2 of Fig. 1.

The mirrors 17 and 18 are placed obliquely in a plane containing the apertures 9 and 10 to direct the images of both sides of the document D to the camera lens 19. It can be readily appreciated at this point, that if the document is made of a relatively translucent paper or similar material, the mirror 17 will not only receive the reflected image of the left side of the document D, see Fig. 2, but also the image of the right side which will be transmitted through the document. In a like manner, the mirror 18 will receive the reflected image of the right side of the document D and the transmitted image of the left side. In order to eliminate the transmitted images of both sides of the document, I have provided a filter means adjacent each aperture 9 and 10 and between each mirror 17 and 18 and the camera lens 19.

The filter means comprises filter plates 21 and 22 adjacent the apertures 9 and 10 and filter plates 23 and 24 in the paths of the reflected images between the mirrors 17 and 18 and the camera lens 19. The filters 21 and 23 and 22 and 24 are complementary in color, i. e., 21 and 23 may be red filters and 22 and 24 blue filters. In this way, the document is illuminated on one side with red light and on the other side with blue light, and the filters 21 and 23, which are red, eliminate the blue light which is transmitted through the document D. In a similar manner, the blue filter 22 illuminates the document with blue light and the filters 22 and 24, which are blue, eliminate the red light which is transmitted through the document D. With this arrangement of filters, the transmitted image of both sides of the document is entirely eliminated and only the reflected image is directed by the mirrors 17 and 18 to the camera lens 19.

Although in the preferred embodiment of my invention, I have shown filters adjacent the exposure apertures or document station, and in the path of the reflected image between the mirrors and camera lens, it is possible to eliminate the last-mentioned filters when photographing documents which are very nearly opaque and in which the transmitted image will be very faint. Also, it is possible to utilize the mirrors 17 and 18 as the second set of filters by making the mirrors from a filter glass or by coating the surface of said mirrors so that the complementary transmitted images which are not completely eliminated by the filters adjacent the document station will be absorbed by the mirrors. Those skilled in the art will also understand that my invention in its broadest aspect is equally useful for copying machines in which the document and film are moved continuously and in which the document and film are stationary during photographing.

I claim:

1. In photographic recording apparatus for simultaneously photographing both sides of a document, the combination with a camera, a document station, and reflecting means on each side of said station for directing to side by side positions the reflected images of the obverse and reverse sides of said document together with the images transmitted through said document onto a sensitized material in said camera, of light means for simultaneously illuminating both sides of said document when at said station, and a pair of filters each adjacent opposite sides of said document station and each complementary in color to the other filter, each of said filters being between said light means and the respective side of said document station and positioned in the optical axis of said apparatus, each transmitting light of a predetermined color to the respective sides of said document, and each absorbing light of complementary color to eliminate the images formed by the light transmitted through said document.

2. In photographic recording apparatus for simultaneously photographing both sides of a document, the combination with a feedway providing two transverse exposure apertures, said apertures being spaced apart and in registry, feeding means for continuously moving said document past said exposure apertures, advancing means for moving a light-sensitive material in synchronism with the movement of said document, and reflecting means on each side of said feedway for directing to side by side positions the reflected images of the obverse and reverse sides of said document together with the images transmitted through said document onto said light-sensitive material, of light means for simultaneously illuminating both sides of said document as it passes said apertures, and a pair of filters each adjacent said apertures and each complementary in color to the other filter, each of said filters being between said light means and the respective aperture and positioned in the optical axis of said apparatus and parallel to the document plane, each transmitting light of a predetermined color through the respective aperture, and each absorbing light of complementary color to eliminate the images formed by the light transmitted through said document.

ROY S. HOPKINS.

REFERENCES CITED

The following references are of record in the file of this patent:

UNITED STATES PATENTS

| Number | Name | Date |
|---|---|---|
| 1,253,137 | Brewster | Jan. 8, 1918 |
| 1,391,807 | Swalm et al. | Sept. 27, 1921 |
| 2,291,006 | Stuart | July 28, 1942 |
| 2,372,890 | Fassel | Apr. 3, 1945 |

FOREIGN PATENTS

| Number | Country | Date |
|---|---|---|
| 91,256 | Austria | Feb. 10, 1923 |